US010760572B2

(12) United States Patent
Takahashi

(10) Patent No.: US 10,760,572 B2
(45) Date of Patent: Sep. 1, 2020

(54) PUMP DEVICE

(71) Applicant: MIKUNI CORPORATION, Tokyo (JP)

(72) Inventor: Jun Takahashi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 224 days.

(21) Appl. No.: 15/576,849

(22) PCT Filed: May 17, 2016

(86) PCT No.: PCT/JP2016/064551
§ 371 (c)(1),
(2) Date: Nov. 27, 2017

(87) PCT Pub. No.: WO2016/194598
PCT Pub. Date: Dec. 8, 2016

(65) Prior Publication Data
US 2018/0163721 A1  Jun. 14, 2018

(30) Foreign Application Priority Data
Jun. 5, 2015 (JP) ................................ 2015-115140

(51) Int. Cl.
*F04C 15/00* (2006.01)
*F04B 53/00* (2006.01)
(Continued)

(52) U.S. Cl.
CPC ............ *F04C 15/008* (2013.01); *F04B 17/03* (2013.01); *F04B 53/00* (2013.01); *F04C 2/10* (2013.01);
(Continued)

(58) Field of Classification Search
CPC .... F04C 2/102; F04C 11/008; F04C 2240/40; F04C 2230/60; F04C 15/008; F04C 2/10;
(Continued)

(56) References Cited

U.S. PATENT DOCUMENTS 3,046,604 A * 7/1962 Graham ................. H02K 15/12
                                                            249/91
5,672,927 A * 9/1997 Viskochil ............... H02K 1/146
                                                            310/194
(Continued)

FOREIGN PATENT DOCUMENTS

DE  102005027439  1/2006
DE  102007059783  6/2008
(Continued)

OTHER PUBLICATIONS

"International Search Report (Form PCT/ISA/210) of PCT/JP2016/064551", dated Aug. 9, 2016, with English translation thereof, pp. 1-3.
(Continued)

*Primary Examiner* — Charles G Freay
(74) *Attorney, Agent, or Firm* — JCIPRNET

(57) ABSTRACT

The present invention provides a pump device and a method of manufacturing a pump device. This pump device is provided with: a pump main body which is provided with hole portions in an abutting surface on the opposite side to a side on which a pump rotor is accommodated; a motor portion provided with a rotor attached to an outer circumference of a rotating shaft, a stator core which faces an outer periphery of the rotor and an end surface of which, in the axial direction of the rotating shaft, is in contact with the abutting surface, and coils attached to the stator core with the interposition of bobbins; and a resin molded portion which integrally retains the stator core and in which posi-
(Continued)

tioning pins that protrude from the end surface and are inserted into the hole portions are provided integrally.

7 Claims, 7 Drawing Sheets

(51) Int. Cl.

| | | |
|---|---|---|
| F04C 2/10 | (2006.01) | |
| H02K 1/14 | (2006.01) | |
| H02K 5/08 | (2006.01) | |
| H02K 5/22 | (2006.01) | |
| H02K 5/15 | (2006.01) | |
| H02K 7/14 | (2006.01) | |
| H02K 3/00 | (2006.01) | |
| H02K 1/18 | (2006.01) | |
| H02K 21/16 | (2006.01) | |
| F04B 17/03 | (2006.01) | |
| F04C 11/00 | (2006.01) | |

(52) U.S. Cl.
    CPC ............ *F04C 11/008* (2013.01); *H02K 1/146* (2013.01); *H02K 1/185* (2013.01); *H02K 3/00* (2013.01); *H02K 5/08* (2013.01); *H02K 5/15* (2013.01); *H02K 5/225* (2013.01); *H02K 7/14* (2013.01); *H02K 21/16* (2013.01); *F04C 2/102* (2013.01); *F04C 2230/60* (2013.01); *F04C 2240/40* (2013.01)

(58) Field of Classification Search
    CPC ........... F04B 17/03; F04B 53/00; H02K 7/14; H02K 5/225; H02K 5/00; H02K 5/02; H02K 5/08; H02K 5/12; H02K 5/15; H02K 5/22; H02K 5/26; H02K 3/00; H02K 1/185; H02K 1/146; H02K 21/16
    See application file for complete search history.

(56) References Cited

U.S. PATENT DOCUMENTS

| | | | | |
|---|---|---|---|---|
| 5,853,643 | A * | 12/1998 | Bauer ............... | B29C 45/14639 264/272.15 |
| 2001/0045782 | A1* | 11/2001 | Lieu ................... | G11B 19/2009 310/67 R |
| 2005/0012387 | A1* | 1/2005 | Suzuki ................. | F04C 2/102 303/116.4 |

FOREIGN PATENT DOCUMENTS

| | | |
|---|---|---|
| JP | 2012191772 | 10/2012 |
| JP | 2013064356 | 4/2013 |
| JP | 2014136975 | 7/2014 |

OTHER PUBLICATIONS

"Office Action of Germany Counterpart Application," with English translation thereof, dated Oct. 29, 2019, p. 1-p. 10.

* cited by examiner

PUMP DEVICE

CROSS-REFERENCE TO RELATED APPLICATION

This application is a 371 application of the International PCT application serial no. PCT/JP2016/064551, filed on May 17, 2016, which claims priority benefits of Japan Patent Application No. 2015-115140 filed on Jun. 5, 2015. The entirety of each of the above-mentioned patent applications is hereby incorporated by references herein and made a part of this specification.

BACKGROUND OF THE INVENTION

Field of the Invention

The present invention relates to a pump device.

Description of Related Art

In vehicles such as automobiles, a pump device using oil is used to cool driving parts, for example, such as an engine and a motor (driving motor, power generating motor). For example, as one of such pump devices, there is a device which is driven by an electric motor as disclosed in Patent Literature 1. In a constitution disclosed in Patent Literature 1, a ring-shaped inner circumferential flange portion 213 is provided at a pump main body 21. Further, a ring-shaped portion 142a is provided on an inner diameter side of a stator module 140, and the inner circumferential flange portion 213 described above is fitted to an inner circumferential side of the ring-shaped portion 142a. By such a so-called socket and spigot fitting constitution, a position of a plane direction between the stator module 140 and the pump main body 21 is determined.

Further, an inner diameter protruding portion 216 having a hole portion is provided on an outer circumferential side in relation to the inner circumferential flange portion 213 of the pump main body 21, and a positioning metal pin for positioning between the hole portion and a stator core 60 is inserted into the hole portion. Furthermore, a positioning hole portion is also provided in the stator core 60, and the above-mentioned metal pin is inserted into the hole portion. Due to such insertion of the metal pin, a position of a rotational direction between the stator module 140 and the pump main body 21 is determined.

CITATION LIST

Patent Literature

[Patent Literature 1]
Japanese Unexamined Patent Application Publication No. 2014-136975

SUMMARY OF THE INVENTION

Technical Problem

However, in the constitution disclosed in Patent Literature 1, a separate metal pin is required to assemble the stator module 140 and the pump main body 21. Therefore, as the number of components is increased, a process for inserting the metal pin into the hole portion is also required. Thus, there is a problem that a cost increases.

Further, in the constitution disclosed in Patent Literature 1 described above, a fitting constitution similar to a socket and a spigot is adopted between the ring-shaped portion 142a and the inner circumferential flange portion 213. When such a configuration is adopted, there are two ring-shaped protruding portions (the ring-shaped portion 142a and the inner circumferential flange portion 213), a space for fitting them is thus required, and a dimension in a radial direction is increased. Further, the two ring-shaped protruding portions are required to have a predetermined thickness for securing strength. Accordingly, there is also a problem that miniaturization is difficult when such a fitting constitution similar to the socket and the spigot is adopted.

Further, in the constitution disclosed in Patent Literature 1, since the fitting constitution similar to the socket and the spigot which are engaged with irregularities is adopted at an abutting portion between the pump main body 21 formed of a metal such as an aluminum alloy and the stator core 60 formed of a metal such as an electromagnetic steel plate, an abutting area between the metals becomes small. In this case, heat generated on an electric motor 30 side may not be satisfactorily transferred to the pump main body 21, and heat radiation performance may be degraded.

The present invention has been made on the basis of the above circumstances, and an object thereof is to provide a pump device which is capable of reducing the number of components, thereby reducing man-hours and enabling miniaturization, and also capable of increasing an area of an abutting portion between metals of a pump main body and a stator core, and a method of manufacturing the pump device.

Solution to Problem

To solve the above-described problems, according to a first aspect of the present invention, there is provided a pump device which suctions and discharges a fluid by driving of a pump rotor, including a pump main body configured to accommodate the pump rotor and having a hole portion in an abutting surface on an opposite side to a side in which the pump rotor is accommodated; a motor portion including a rotor installed on an outer circumference of a rotating shaft, a stator core facing an outer circumference of the rotor and having an end surface of the stator core in an axial direction be in contact with the abutting surface, and a coil installed at the stator core through a bobbin; and a molded portion configured to integrally hold the stator core and integrally provided with a positioning pin protruding from the end surface and inserted into the hole portion.

Also, according to another aspect of the present invention, in the invention described above, a through-hole may be provided in the stator core, and the through-hole may pass through the stator core in the axial direction of the rotating shaft, and a bottom side molded portion which supports the stator core on an opposite side to the end surface in contact with the abutting surface in the axial direction may be provided at the molded portion, and the positioning pin may pass through the through-hole from the bottom side molded portion and may protrude from the end surface.

Also, according to yet another aspect of the present invention, in the invention described above, a plurality of main pole teeth protruding toward an inner circumference side may be provided at the stator core, a coil winding body having a coil may be installed at the main pole teeth, an insulating cover portion which covers the coil winding body protruding from the end surface may be intermittently provided in the molded portion in a circumferential direction, the positioning pin may protrude from between the adjacent insulating cover portions, and a protruding height thereof may be lower than a protruding height of the insulating cover portion from the end surface.

Also, according to still another aspect of the present invention, in the invention described above, a plurality of the positioning pins may be provided in a circumferential direction of the stator core, a plurality of the hole portions of a greater number than the positioning pins may be provided in a circumferential direction of the pump main body, hole portions into which positioning pins are not inserted may be screw holes, and screws which fix the stator core may be screwed into the screw holes.

Also, according to yet another aspect of the present invention, in the invention described above, the pump main body may be formed from a die cast product, the hole portions into which the positioning pins are inserted and the screw holes may be alternately arranged in a circumferential direction of the abutting surface, an arrangement pattern of the hole portions into which the positioning pins are inserted and the screw holes may be two arrangement patterns including a first arrangement pattern of a predetermined angular arrangement and a second arrangement pattern in which positions of the hole portions into which the positioning pins are inserted and the screw holes are exchanged with respect to the first arrangement pattern, and one of the first arrangement pattern and the second arrangement pattern may be provided on the abutting surface.

Also, according to a second aspect of the present invention, there is provided a method of manufacturing a pump device including an installation process in which a stator core is installed on a wall surface of a movable mold of a mold while an end surface of the stator core in contact with an abutting surface of a pump main body is in contact with the wall surface, an injection process in which the movable mold is in a mold closed state in which the movable mold abuts a fixed mold of the mold and is then in a state in which the end surface is pressed against the wall surface of the movable mold by an injection pressure generated when a melted resin is injected into a hollow portion formed between abutting portions in the mold closed state and thus a molded portion having a positioning pin protruding from the end surface is formed by the injection, a taking-out process in which the movable mold is moved to a mold opening state and a stator module integrally formed with the stator core is taken out, and a mounting process in which the end surface comes in contact with the abutting surface while the positioning pin is inserted into a hole portion provided in the abutting surface and thus the pump main body is installed at the stator module.

Advantageous Effects of Invention

According to the present invention, it is possible to reduce the number of components, thereby reducing man-hours and enabling miniaturization and also to increase an area of an abutting portion between metals of a pump main body and a stator core.

DETAILED DESCRIPTION OF THE INVENTION

Hereinafter, a pump device 10 and a method of manufacturing the pump device 10 according to one embodiment of the present invention will be described with reference to the drawings. Further, in the following description, it is assumed that an axial direction of a rotating shaft 31 is an X direction, a cover body 150 side of the rotating shaft 31 is an X1 side, and a pump cover 24 side is an X2 side.

1. Regarding Constitution of Pump Device 10

Figure 1:
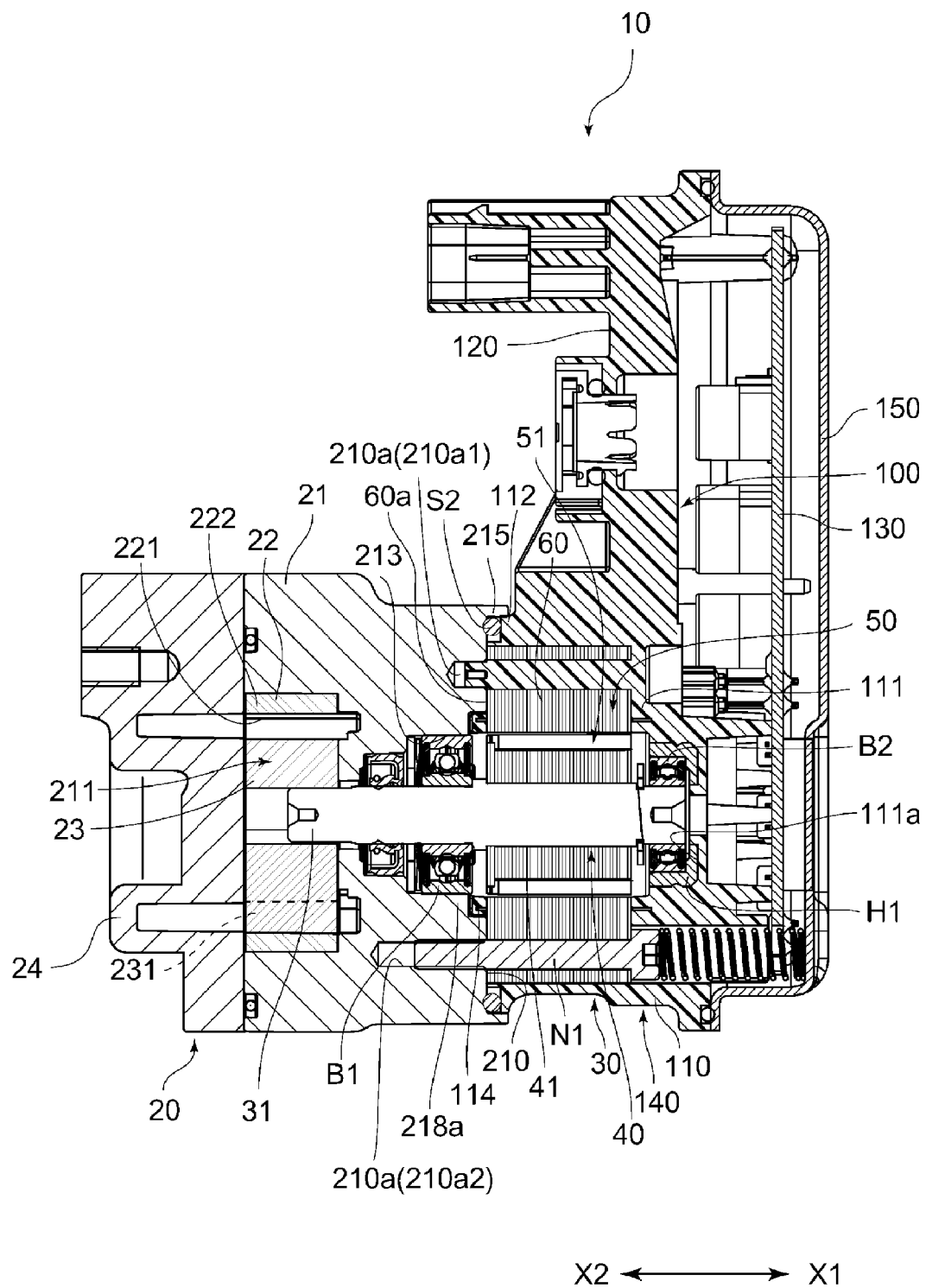
FIG. 1 is a side cross-sectional view illustrating a constitution of a pump device according to one embodiment of the present invention.

FIG. 1 is a cross sectional view illustrating a constitution of the pump device 10. The pump device 10 includes a pump unit 20, a motor portion 30, a circuit board 130 and a stator module 140, which are integrated by fastening means such as a screw N1 and other screws. Hereinafter, each constitution will be described.

In the embodiment, the pump unit 20 is a trochoid pump (internal gear type pump). As shown in FIG. 1, the pump unit 20 includes a pump main body 21, and the pump main body 21 has a concave portion 211 for disposing an outer rotor 22 and an inner rotor 23. The concave portion 211 is formed to be recessed from an end surface of the pump main body 21 on the X2 side toward the X1 side by a depth capable of accommodating the outer rotor 22 and the inner rotor 23, and a planar shape thereof has a size corresponding to the outer rotor 22. Further, the outer rotor 22 and the inner rotor 23 correspond to a pump rotor.

Additionally, a pump cover 24 is installed on the X2 side of the pump main body 21, and thus the concave portion 211 is covered with the pump cover 24.

The outer rotor 22 is rotatably disposed in the concave portion 211. However, a rotational center of the outer rotor 22 is decentered from a rotational center of the inner rotor 23 and the rotating shaft 31. In a known manner, the outer rotor 22 has an inner circumferential concave portion 221 on an inner circumferential side thereof, and an inner wall surface of the inner circumferential concave portion 221 serves as an inner gear 222. The inner rotor 23 is disposed in the inner circumferential concave portion 221, and an outer gear 231 which comes in contact with and separates from the inner gear 222 is provided on an outer circumferential wall surface of the inner rotor 23. The inner gear 222 and the outer gear 231 are formed by a trochoid curve.

Further, the rotational center of the inner rotor 23 is provided so that a hole portion through which the rotating shaft 31 is inserted can be engaged with the rotating shaft 31.

Furthermore, the pump device 10 is not limited to the trochoid pump as described above, and various pumps such as an external gear pump, a vane pump, a centrifugal pump, a cascade pump, a piston pump and so on can be used.

Figure 2:
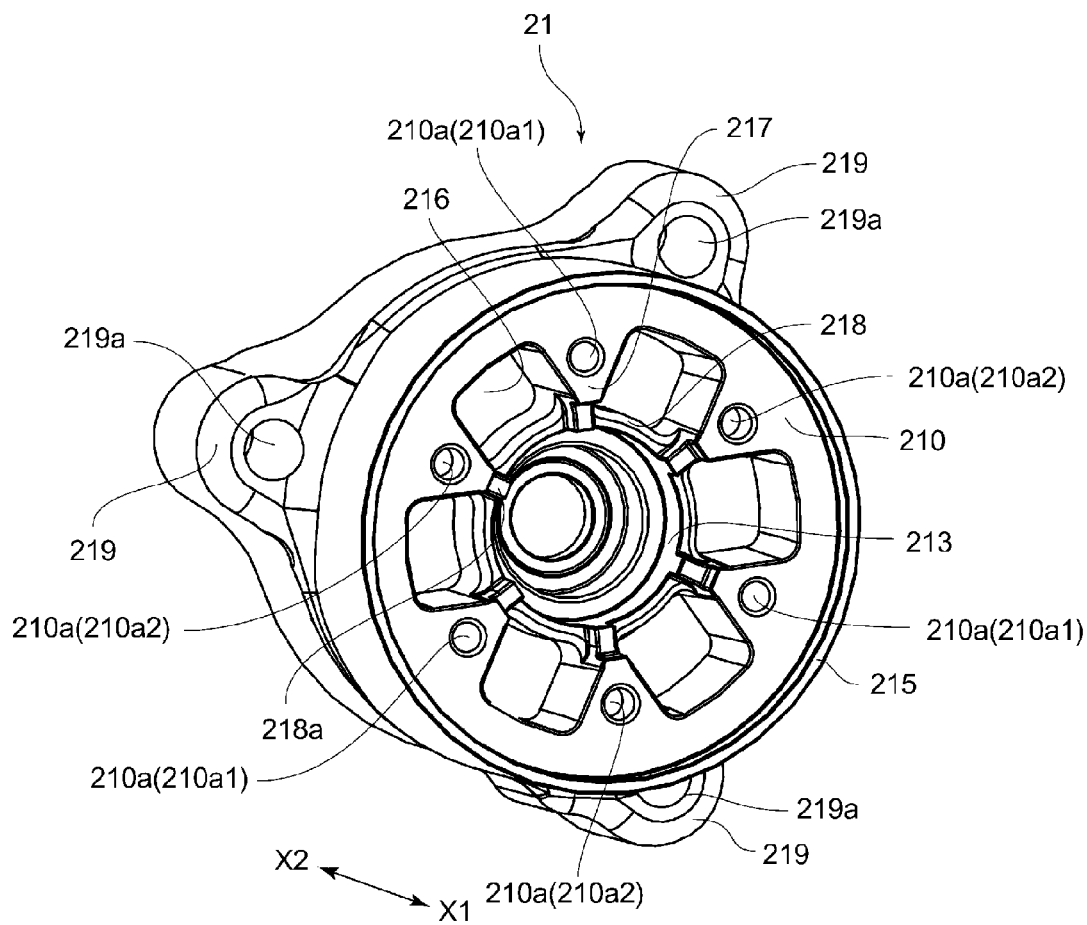
FIG. 2 is a view illustrating a constitution of a pump main body of the pump device of FIG. 1 and is a perspective view seen from an abutting surface side abutting on a stator core.

FIG. 2 is a view illustrating a constitution of the pump main body 21 and is a perspective view seen from an abutting surface 210 side abutting on a stator core 60. As illustrated in FIGS. 1 and 2, an abutting surface 210 abutting on the stator core 60 is provided on one end side (X1 side) of the pump main body 21. A fitting portion 213 is provided to be recessed from the abutting surface 210 toward the other end side (X2 side), and a bearing B1 is fitted into the fitting portion 213 as illustrated in FIG. 1. Also, one end side (end side on the X1 side) of the rotating shaft 31 is rotatably supported by a bearing B2 fitted in a holder H1 located in a concave fitting portion 111a which will be described later.

In addition, as illustrated in FIGS. 1 and 2, an outer circumferential flange portion 215 is provided on an outer circumferential edge portion of the abutting surface 210 to protrude toward one side (X1 side), and a seal member S2 such as an O-ring is disposed in an inner circumference of the outer circumferential flange portion 215. An inside of the motor portion 30 is sealed from the outside by a seal member S2 coming into contact with the other end side (X2 side) portion of an outer circumferential molded portion 112 of a stator mold portion 110.

Figure 3:
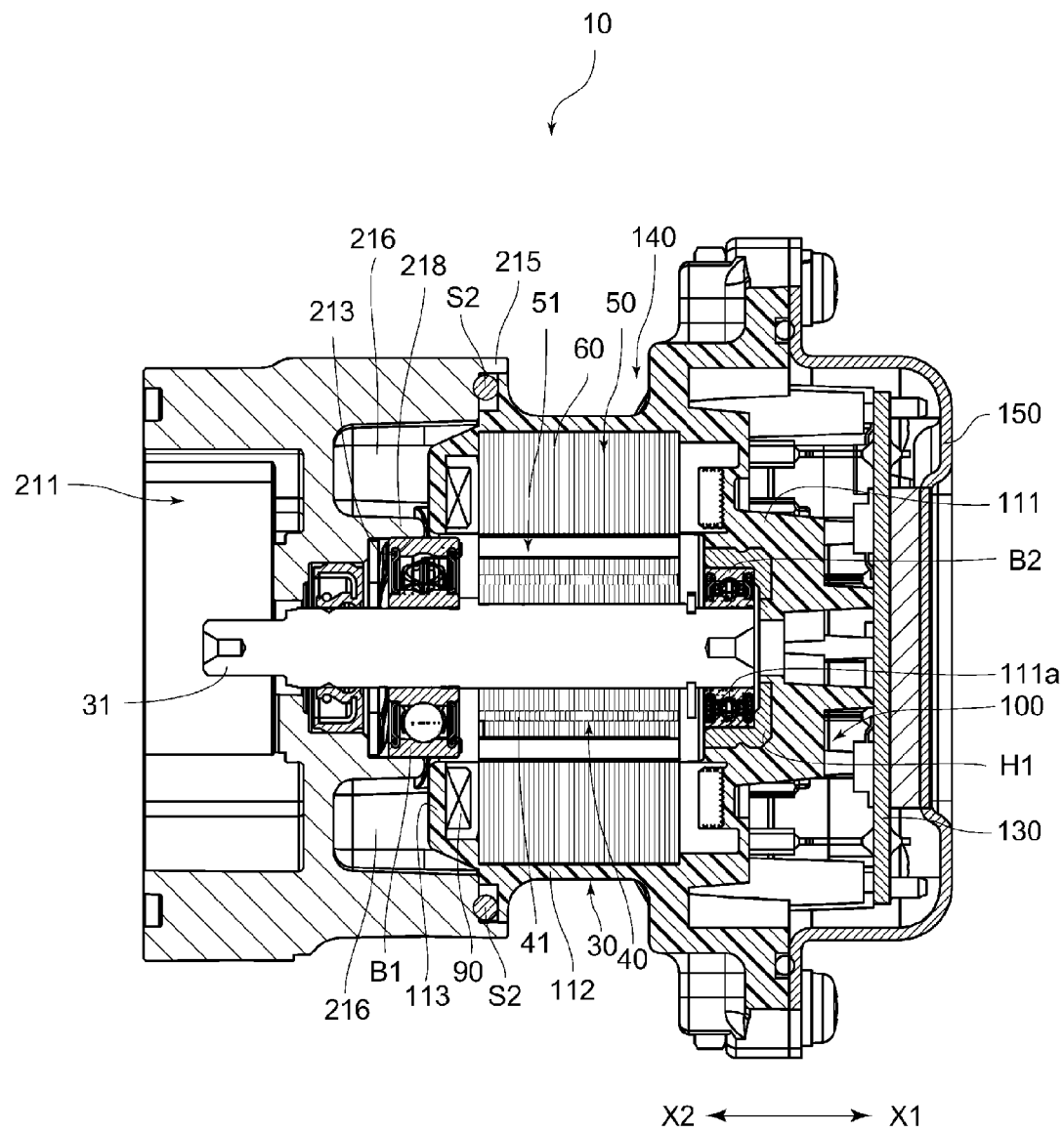
FIG. 3 is a cross-sectional view illustrating a constitution of the pump device and is a view illustrating a cross-sectional shape of a pump unit and a motor unit at a position which is shifted 90 degrees in a circumferential direction with respect to FIG. 1.

FIG. 3 is a cross-sectional view illustrating a constitution of the pump device 10 and is a view illustrating a cross-sectional shape of the pump unit 20 and the motor portion 30 at a position which is shifted 90 degrees in a circumferential direction with respect to FIG. 1. Also, in FIG. 3, illustration of the outer rotor 22, the inner rotor 23 and the pump cover 24 is omitted. As illustrated in FIGS. 2 and 3, a pocket portion 216 which is recessed toward the other side (X2 side) is provided on a portion of the abutting surface 210 on an outer diameter side from the fitting portion 213. The pocket portion 216 is a portion for inserting an insulating cover portion 113 which protrudes to the other side (X2 side) of the stator mold portion 110 which will be described later.

Also, as illustrated in FIG. 2, a total of six inner diameter protruding portions 217 are provided between the adjacent pocket portions 216 of the pump main body 21, and an end surface of the inner diameter protruding portion 217 on one end side (X1 side) serves as the abutting surface 210. The inner diameter protruding portion 217 is provided to have an approximately triangular shape when seen in a plan view.

Hole portions 210a are provided toward the other side (X2 side) from the abutting surface 210 side of each inner diameter protruding portion 217. The above-described screw N1 is screwed into the hole portions 210a, or a positioning pin 115 to be described later is inserted therein. Therefore, in the hole portions 210a, there are hole portions 210a in which a screw thread is formed and hole portions 210a in which no screw thread is formed. In the embodiment, the screw threads are formed in the three hole portions 210a formed at intervals of 120 degrees among the total of six hole portions 210a formed at intervals of 60 degrees, and no screw threads are formed in the remaining three hole portions 210a. In the following description, the hole portions 210a in which the screw threads are not formed are defined as hole portions 210a1, and those in which the screw threads are formed are defined as hole portions 210a2. Further, the hole portions 210a are formed not to pass through the pump main body 21.

Further, as illustrated in FIGS. 2 and 3, an inner circumferential rib 218 which separates the pocket portion 216 and the fitting portion 213 is provided on an inner circumferential side of the pocket portion 216. The inner circumferential rib 218 is provided in a ring shape to connect a distal end of the inner diameter protruding portion 217 on the inner diameter side and protrudes from a bottom portion of the inner diameter protruding portion 217 to one side (X1 side). However, a projecting dimension thereof to one side (X1 side) is provided to be shorter than the inner diameter protruding portion 217 and covers only about half of the bearing B1. Therefore, a holding protrusion 218a protruding to one side (X1 side) further than the inner circumferential rib 218 is provided on the inner diameter side of the inner diameter protruding portion 217 to enhance a holding property for the bearing B1.

Further, as illustrated in FIG. 2, a flange portion 219 protrudes further outward from the other end side (X2 side) of an outer circumferential surface of the pump main body 21. A screw hole 219a is provided in the flange portion 219, and a bolt (not illustrated) which passes through a through-hole 241a penetrating the flange portion 241 of the pump cover 24 is screwed into the screw hole. Accordingly, the pump cover 24 is installed on the pump main body 21, and the outer rotor 22 and the inner rotor 23 are sealed from the outside.

Figure 4:
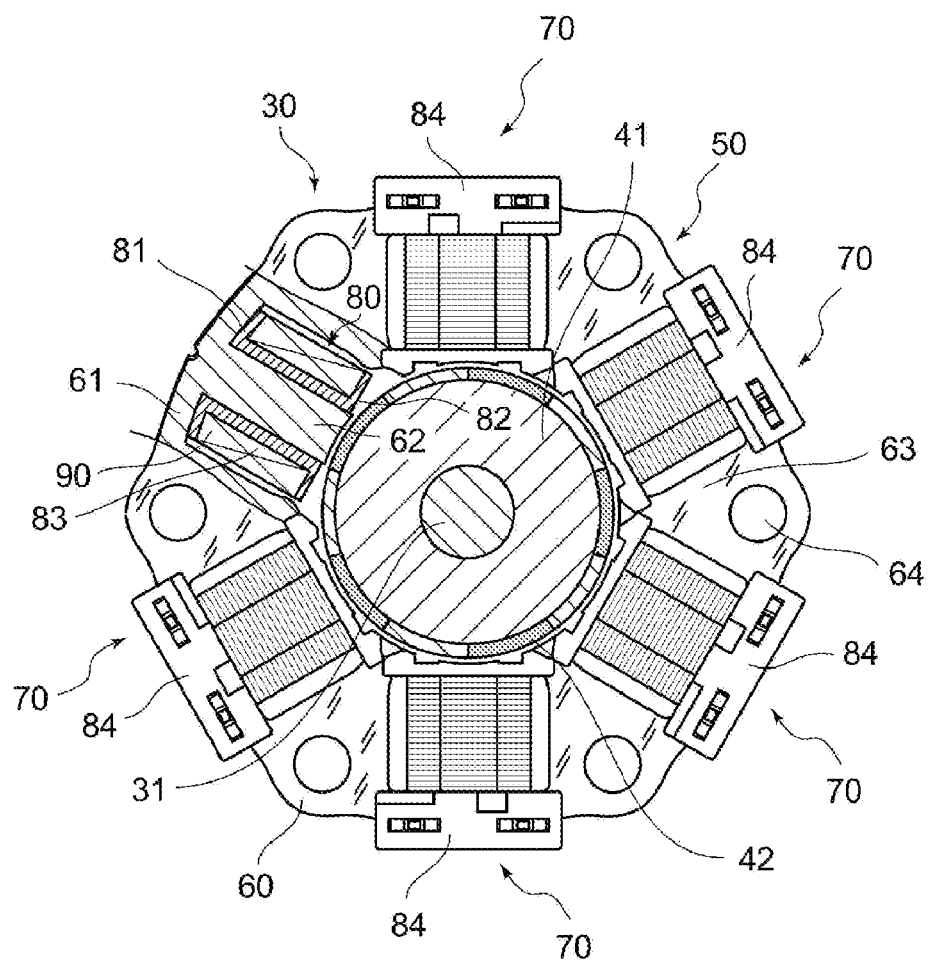
FIG. 4 is a plan view illustrating a constitution of a motor portion of the pump device of FIG. 1 and is a view illustrating a partial cross section thereof.

Next, the motor portion 30 will be described. FIG. 4 is a plan view illustrating a constitution of the motor portion 30 and also illustrates a partial cross section thereof. As illustrated in FIGS. 1 and 4, the motor portion 30 includes the rotating shaft 31 shared with the pump unit 20, and a rotor 40 is provided on an outer circumferential side of the rotating shaft 31. The rotor 40 includes a yoke 41 and a magnet 42. The yoke 41 is installed on the outer circumferential side of the rotating shaft 31 and is formed, for example, by pressing and then stacking an electromagnetic steel plate such as a silicon steel plate having an electrically insulating film on a surface thereof. However, the yoke 41 may be formed of any magnetic material such as ferrite, powder magnetic core or the like. Alternatively, a constitution not using the yoke 41 may be adopted.

A magnet 42 is installed on an outer circumferential side of the yoke 41. The magnet 42 is installed on the outer circumferential side of the yoke 41 in a state in which magnetic poles are changed at predetermined angles. Additionally, although the rotor 40 of the motor portion 30 is constituted by the yoke 41 and the magnet 42 as described above, the rotor 40 may include other members (for example, the rotating shaft 31).

Further, as will be described later, when there are six coils in a stator 50, the same number of S poles and N poles are provided on the outer circumferential side of the rotor 40.

Figure 5:
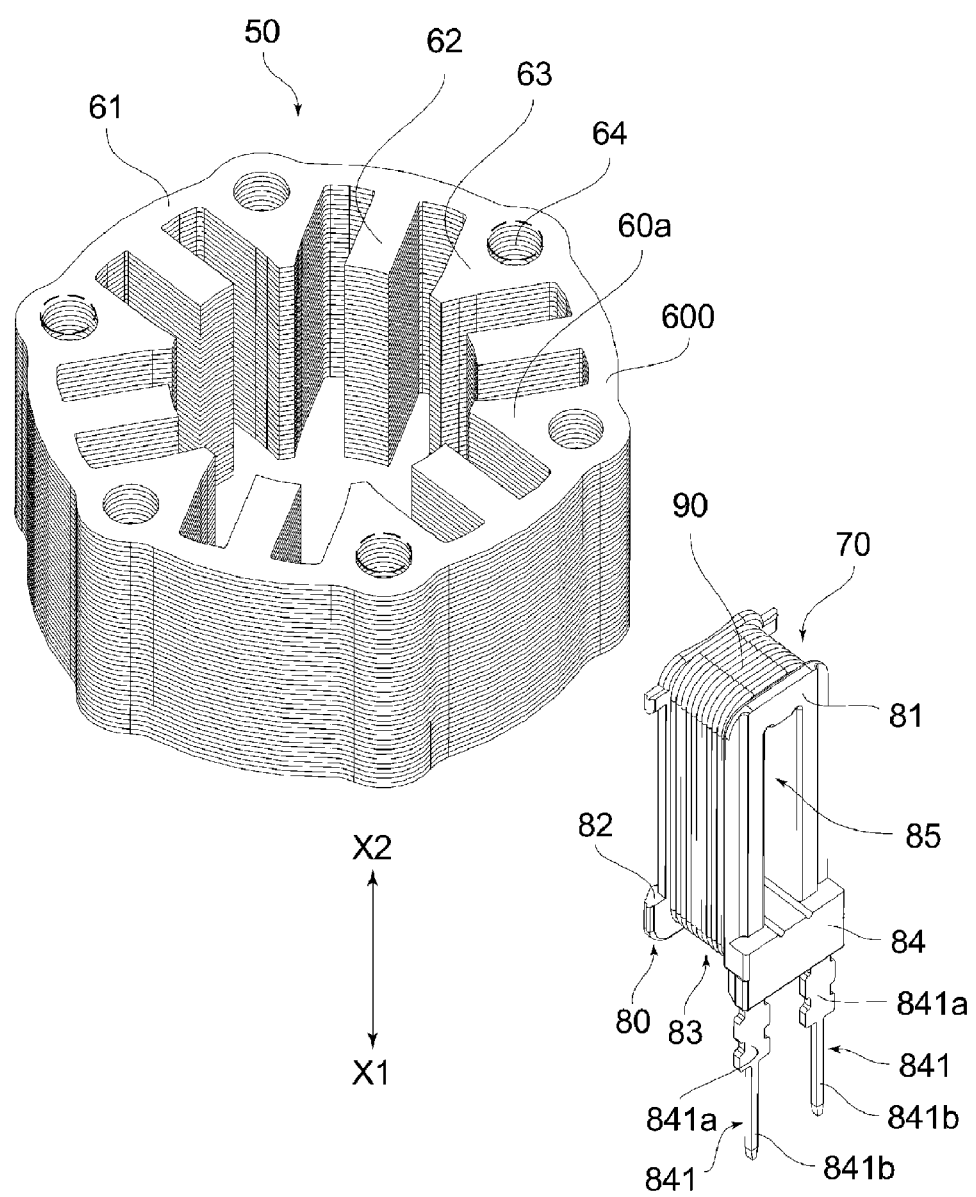
FIG. 5 is a perspective view illustrating a constitution of a stator core and a coil winding body in the pump device of FIG. 1.

As illustrated in FIG. 4, on the outer circumferential side of the rotor 40, the stator 50 is arranged to face the rotor 40. That is, the rotor 40 is located in a center hole 51 of the stator 50. The stator 50 includes a stator core 60 and a coil winding body 70. FIG. 5 is a perspective view illustrating a constitution of the stator core 60 and the coil winding body 70. As illustrated in FIG. 5, the stator core 60 is constituted, for example, by stacking and then pressing a plurality of electromagnetic steel plates 600 such as the silicon steel plate having the electrically insulating film on the surface thereof. However, the stator core 60 may be formed using, for example, a magnetic material other than the electromagnetic steel plate 600, such as ferrite, powder magnetic core or the like.

An outer circumferential ring portion 61, main pole teeth 62 and auxiliary pole teeth 63 are integrally provided at the stator core 60. However, each component constituting the stator core 60 need not have an integral structure. For example, the auxiliary pole teeth 63 may not be integrally formed with the main pole teeth 62 but may have a separate structure. Further, the stator core 60 may adopt a constitution in which the auxiliary pole teeth 63 are not provided. The outer circumferential ring portion 61 is a ring-shaped portion which is located on an outer circumferential side of the stator core 60. The main pole teeth 62 are portions which protrude inward from the outer circumferential ring portion 61 in a radial direction.

The auxiliary pole teeth 63 are arranged between the adjacent main pole teeth 62, but a width of each of the auxiliary pole teeth 63 is provided to be narrower from the outer circumference side toward a center side. Further, a constitution without the auxiliary pole teeth 63 may be adopted.

Here, as illustrated in FIG. 5, through-holes 64 of which a center axis is the X direction are provided in the stator core 60. The through-holes 64 are hole portions for inserting the positioning pin 115 to be described later or the screw N1. The through-holes 64 penetrate all of the electromagnetic steel plates 600 so that the positioning pin 115 or the screw N1 is disposed to pass through all of the electromagnetic steel plates 600.

Also, the through-holes 64 are provided in a portion of the stator core 60 in which the coil winding body 70 is not present and the auxiliary pole teeth 63 are present. Further, the through-holes 64 may be provided in the auxiliary pole teeth 63, may be provided in the outer circumferential ring portion 61 or may be provided in both of them.

In addition, as illustrated in FIGS. 4 and 5, the coil winding body 70 is installed at the main pole teeth 62. In the embodiment, the coil winding body 70 is installed at each of the six main pole teeth 62. The coil winding body 70 includes a bobbin 80 and a coil 90. The coil 90 is formed by winding a conductive wire around the bobbin 80.

The bobbin 80 includes a winding frame portion 83 which is surrounded by an outer flange portion 81 and an inner flange portion 82, and a terminal base portion 84. The winding frame portion 83 is a portion in which the coil 90 is formed by the winding of the conductor wire and is a portion for positioning the coil 90. Also, a connection terminal 841 formed of a conductive member (metal or the like) is integrally installed at the terminal base portion 84. The connection terminal 841 has a binding portion 841a to which a terminal of the conductive wire is bound and a pin portion 841b inserted into a pin hole of the circuit board 130 which will be described later. Also, an insertion hole 85 which passes through from the outer flange portion 81 to the inner flange portion 82 is provided in the bobbin 80. Each of the main pole teeth 62 described above is inserted into the insertion hole 85.

Further, a resin molded portion 100 corresponding to a molded portion is integrally installed at the stator core 60 described above. The resin molded portion 100 is a portion which is integrally formed with the stator core 60 by installing the holder H1 or the like for supporting the bearing B2 in a mold, installing the stator core 60 with the coil winding body 70 installed thereat, and then injecting a resin.

Figure 6:
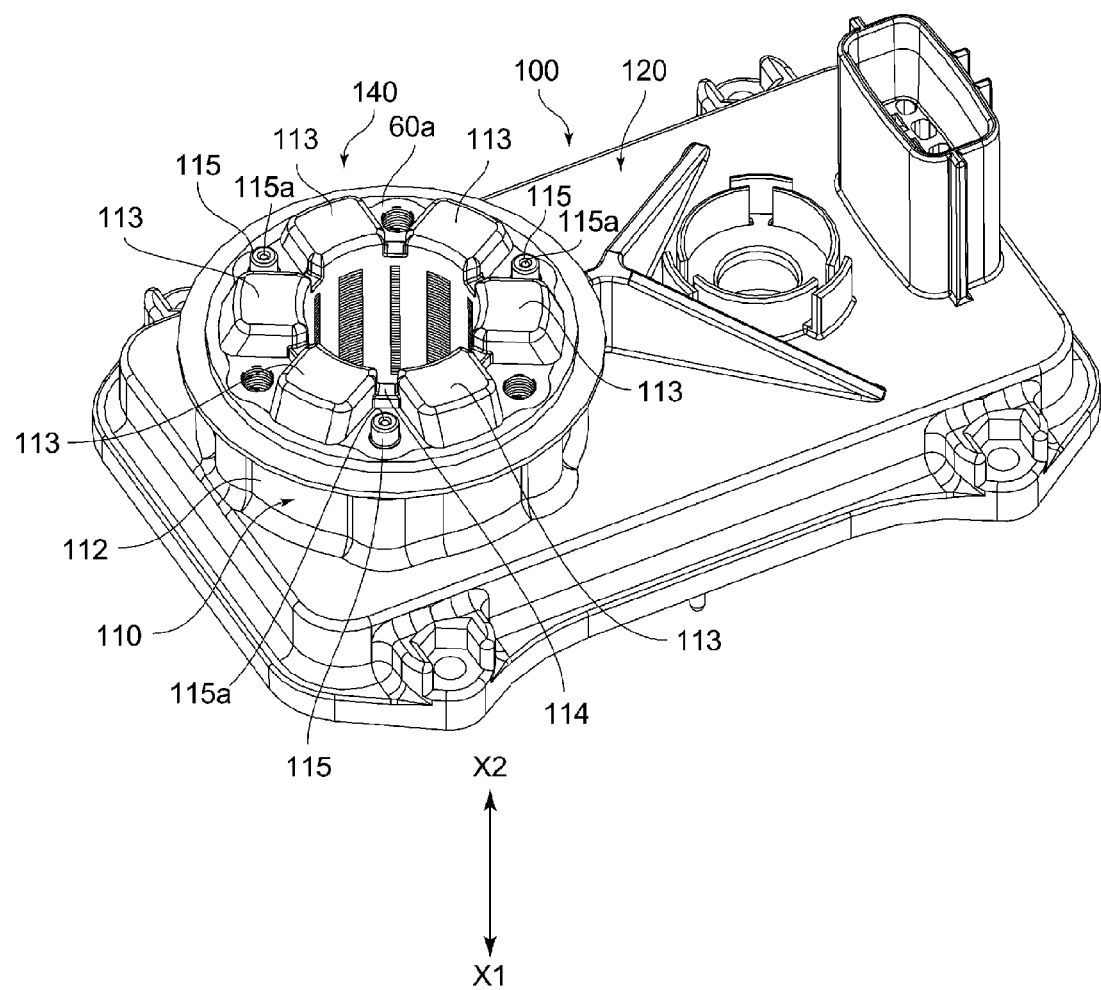
FIG. 6 is a perspective view illustrating a resin molded portion integrally formed with the stator core in the pump device of FIG. 1.
Figure 7:
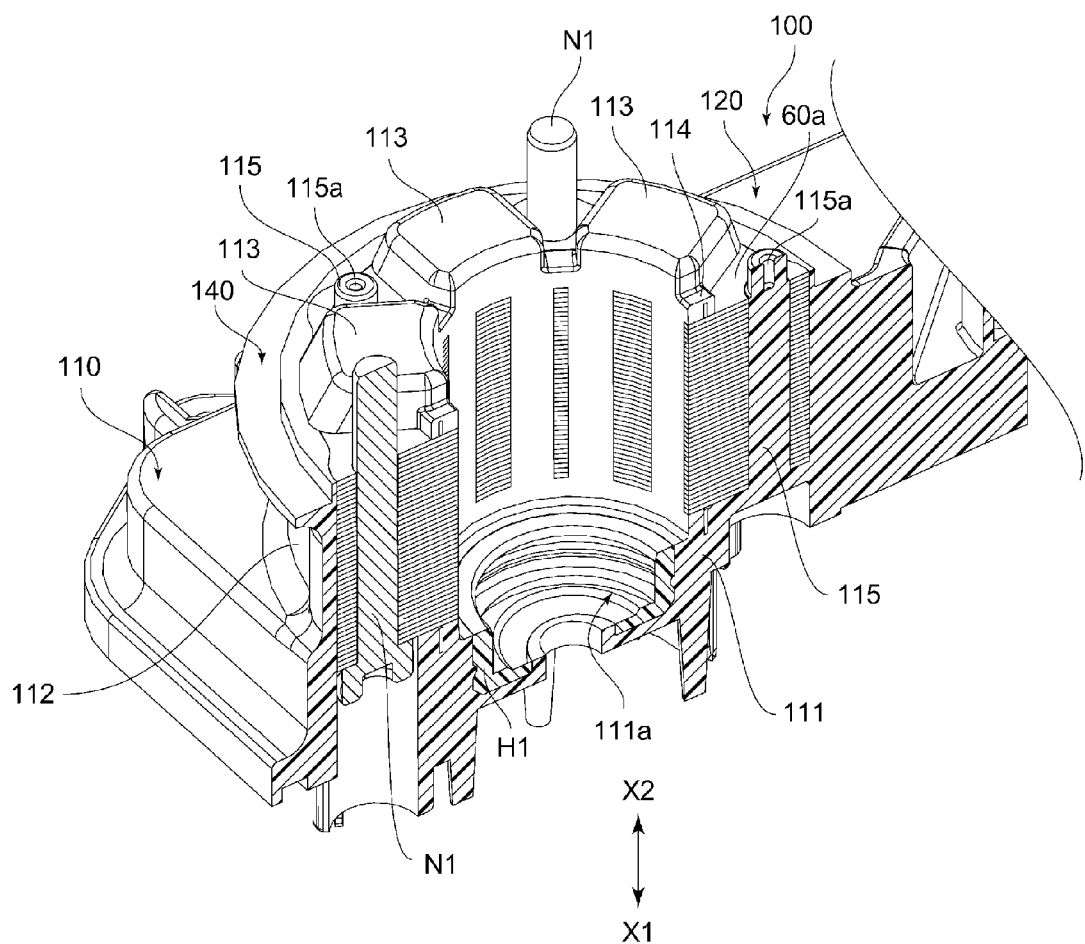
FIG. 7 is a perspective view illustrating a state in which the resin molded portion illustrated in FIG. 6 is shown in a half cross section.

FIG. 6 is a perspective view illustrating the resin molded portion 100 integrally formed with the stator core 60. FIG. 7 is a perspective view illustrating a state in which the resin molded portion 100 illustrated in FIG. 6 is shown in a half cross section. As illustrated in FIGS. 6 and 7, the resin molded portion 100 has a stator mold portion 110 which has an approximately cylindrical shape and constitutes the motor portion 30, and a board mounting portion 120 which has a rectangular box shape.

In addition, as illustrated in FIG. 1, the circuit board 130 and other components are installed on the board mounting portion 120, and the cover body 150 is installed on the board mounting portion 120, whereby the circuit board 130 and so on are sealed from the outside. Further, in the following description, the stator core 60 or the like integrated with the resin molded portion 100 is referred to as the stator module 140 as necessary.

In the above-described stator mold portion 110, a bottom side molded portion 111 is provided on one side (X1 side), and an end of the stator core 60 on one side (X1 side) is supported by the bottom side molded portion 111. Further, the concave fitting portion 111a which is recessed toward one side (X1 side) is provided on a radial center side of the bottom side molded portion 111, the concave holder H1 is installed in the concave fitting portion 111a, and the bearing B2 is fitted into the holder H1. Additionally, one end side (X1 side) of the rotating shaft 31 is supported by the bearing B2.

An outer circumferential molded portion 112 is provided on the outer circumferential side of the stator core 60 in the stator mold portion 110, and the outer circumferential molded portion 112 covers the outer circumferential side of the stator core 60.

Further, as described above, the coil winding body 70 is installed at each of the main pole teeth 62, and the insulating cover portion 113 is provided to cover the other side (X2 side) of the coil winding body 70. As illustrated in FIGS. 6 and 7, the insulating cover portion 113 is raised toward the other side (X2 side) from the stator core 60 (electromagnetic steel plate 600) located furthest toward the other end side (X2 side). However, the insulating cover portion 113 is in a state in which it does not cover the auxiliary pole teeth 63 very much. Accordingly, portions of the auxiliary pole teeth 63 which are not covered with the insulating cover portion 113 abut the stator core 60 located at the most other end side (X2 side).

Further, a connecting rib 114 protruding from the stator core 60 toward the other side (X2 side) is provided on the inner diameter side facing the center hole 51 between the adjacent insulating cover portions 113. A height of the connecting rib 114 which is raised toward the X2 side in relation to the insulating cover portion 113 is low. The connecting rib 114 enhances strength of the inner diameter side of the stator mold portion 110 on the X2 side and secures wraparound of a resin at the time of injection molding.

Here, as illustrated in FIGS. 1, 6 and 7, the positioning pin 115 protrudes from the bottom side molded portion 111 on an outer diameter side in relation to the concave fitting portion 111a. The positioning pin 115 extends through the through-hole 64 and protrudes toward the other side (X2 side) in relation to the stator core 60. That is, at the time of injection molding, the resin enters the through-hole 64, and thus the positioning pin 115 which extends to the other side (X2 side) in relation to the stator core 60 is formed.

As illustrated in FIG. 6, the positioning pin 115 is located between the insulating cover portions 113. Further, a protruding height of the positioning pin 115 toward the X2 side is lower than that of the insulating cover portion 113. Therefore, it is possible to prevent the positioning pins 115 from being damaged when the pump main body 21 is assembled to the resin molded portion 100.

As illustrated in FIGS. 6 and 7, a distal end concave portion 115a is provided to be recessed from a distal end side of the positioning pin 115 toward one side (X1 side) by a predetermined length. Due to the presence of the distal end concave portion 115a, deterioration of dimensional accuracy is prevented even when a sink mark or the like occurs in the resin after the injection molding.

Further, the distal end side of the positioning pin 115 is inserted into the hole portion 210a1 of the pump main body 21 described above. Therefore, a position of a rotational direction of the pump main body 21 is determined with respect to the stator mold portion 110. Also, it is preferable that there be at least two positioning pins 115. When there are two or more positioning pins 115, it is possible to improve positioning accuracy of a plane perpendicular to the X direction within the plane when the pump main body 21 is assembled to the stator mold portion 110, and thus centering of the rotating shaft 31 and so on can be performed satisfactorily.

2. Regarding Method of Manufacturing the Pump Device 10

A method of manufacturing the pump device 10 having the above-described constitution will be described below. When the pump device 10 in the embodiment is manufactured, individual components constituting the pump unit 20 and the motor portion 30 are individually fabricated.

After that, the stator core 60 is installed on a movable side (movable type) of the mold (corresponding to an installation process). In this installation process, an end surface 60a of the stator core 60 on the X2 side is in contact with a movable wall surface. In this state, the movable mold is in a mold closed state in which the movable mold abuts a fixed mold, and in this state, a molten resin is injected into a hollow portion of the mold to perform the injection molding (corresponding to an injection process). At that time, the end surface 60a of the stator core 60 is pressed against a wall surface of the movable mold by a pressure at the time of injection molding. Then, the end surface 60a is exposed without being covered with the resin. Accordingly, the end surface 60a can be brought into direct contact with the abutting surface 210 of the pump main body 21, and heat from the stator core 60 side can be transferred to the pump main body 21.

Further, in this injection process, the resin molded portion 100 having the stator mold portion 110 and the board mounting portion 120 is formed, but at this time, the molten resin enters the through-hole 64 of the stator core 60, and thus the positioning pin 115 is formed in the stator mold portion 110. Also, the positioning pin 115 is formed in a state in which it protrudes from the end surface 60a of the stator core 60.

Additionally, after the molten resin solidifies, the mold is opened, and the stator module 140 in which the stator core 60 and the like is integrally formed with the resin molded portion 100 is taken out (corresponding to a taking-out process). After the taking-out process, the separately formed components are assembled to form the pump device 10. For example, the bearing B2 is installed in the holder H1. Also, one end side (X1 side) of the rotating shaft 31 at which the rotor 40 and an E-ring are installed is inserted into a center hole of the bearing B2. Then, after the bearing B1 and so on is installed at the pump main body 21, the positioning pin 115 formed by the above-described injection process is inserted into the hole portion 210a1 provided in the abutting surface 210 to perform positioning, and the end surface 60a of the stator core 60 is brought into contact with the abutting surface 210, and the pump main body 21 is thus installed at the stator module 140 (corresponding to a mounting process).

Also, the pump device 10 is formed by mounting the other components.

3. Regarding Effects

According to the pump device 10 having the above-described constitution and the method of manufacturing the pump device 10, in the pump main body 21, the hole portion 210a1 is provided in the abutting surface 210 on an opposite side to a side on which the concave portion 211 is provided. Further, the motor portion 30 includes the rotor 40 which is installed on an outer circumference of the rotating shaft 31, the stator core 60 is oppositely provided on an outer circumference of the rotor 40, and the coil 90 is installed at the stator core 60 through the bobbin 80. Furthermore, the resin molded portion 100 integrally holds the stator core 60, and the positioning pin 115 protruding from the end surface 60a and inserted into the hole portion 210a1 is integrally provided.

Accordingly, unlike a current pump device, since the positioning pin 115 is provided integrally with the resin molded portion 100, a separate metal pin is unnecessary. Therefore, it is possible to reduce the number of components. Also, since a separate metal pin is not required, a process for inserting such a separate metal pin is unnecessary, and thus management of a separate metal pin is not required. Therefore, it is possible to reduce man-hours in the manufacturing.

Further, for example, unlike the pump device disclosed in Patent Literature 1, in order to position the pump main body 21 and the resin molded portion 100, it is not necessary to adopt the fitting configuration similar to a socket and a spigot. Accordingly, there is no need for the space for providing two ring-shaped protruding portions as disclosed in Patent Literature 1, and thus a dimension of the pump device 10 in the radial direction can be reduced, and the pump device 10 can be downsized.

In addition, in the embodiment, since the fitting configuration similar to the socket and the spigot is not adopted, it is not necessary to provide such a portion in which the irregularities are fitted like the constitution disclosed in Patent Literature 1. Therefore, it is possible to increase an abutting area between metals, and thus the heat generated in the motor portion 30 is easily transferred to the pump main body 21. Accordingly, the heat radiation performance of the pump device 10 can be enhanced.

Also, in the embodiment, the through-hole 64 penetrating the stator core 60 in the X direction (axial direction of the rotating shaft 31) is provided in the stator core 60. Further, the bottom side molded portion 111 which supports the stator core 60 on the side opposite to the end surface 60a in contact with the abutting surface 210 in the X direction (axial direction) is provided at the resin molded portion 100. Additionally, the positioning pin 115 passes through the through-hole 64 from the bottom side molded portion 111 and protrudes from the end face 60a. Therefore, as compared with a constitution in which the positioning pin 115 protrudes from a portion of the resin molded portion 100 other than the bottom side molded portion 111, it is possible to reduce an area of the end surface 60a of the stator core 60 which is covered with the resin. Therefore, the heat radiation performance of the pump device 10 can be improved.

Furthermore, although the configuration in which the positioning pin 115 protrudes from the bottom side molded portion 111 is adopted, the positioning pin 115 passes through the inside of the through-hole 64. As described above, since the positioning pin 115 passes through the through-hole 64 inside the stator core 60, the positioning pin 115 can be protected by the stator core 60.

Also, in the embodiment, a plurality of main pole teeth 62 protruding toward the inner circumference side is provided at the stator core 60, and the coil winding body 70 having the coil 90 is installed at the main pole teeth 62. Further, the insulating cover portion 113 which covers the coil winding body 70 protruding from the end surface 60a is intermittently provided at the resin molded portion 100 in the circumferential direction, the positioning pin 115 protrudes from between the adjacent insulating cover portions 113, and the protruding height thereof is lower than the protruding height of the insulating cover portion 113 from the end surface 60a. Accordingly, since the positioning pin 115 is located between the insulating cover portions 113 having the protruding height higher than that of the positioning pin 115, the positioning pin 115 is protected by the insulating cover portion 113, whereby it is possible to satisfactorily prevent the positioning pin 115 from being damaged.

Further, when the pump main body 21 is positioned with respect to the resin molded portion 100, it is also possible to use the insulating cover portion 113, and thus the positioning accuracy can be further enhanced. Furthermore, it is possible to reduce stress such as shearing acting on the positioning pin 115.

Further, in the embodiment, a plurality of positioning pins 115 are provided in a circumferential direction of the stator core 60. In addition, a plurality of hole portions 210a of a greater number than the positioning pins 115 are provided in the circumferential direction of the pump main body 21. Further, the screw hole is provided in the hole portion 210a2. Additionally, since the screw N1 for fastening the stator core 60 is screwed into the hole portion 210a2 in which the positioning pin 115 is not inserted, the positioning pins 115 or the screws N1 can be positioned in all the hole portions 210a and thus the hole portions 210a do not remain hollow. Therefore, it is possible to enhance the heat radiation performance.

Further, in the method of manufacturing of the pump device 10 of the embodiment, in the installation process, the corresponding stator core 60 is installed in a state in which the end surface 60a of the stator core 60 which is in contact with the abutting surface 210 of the pump main body 21 is in contact with a wall surface of the movable mold of the mold. Furthermore, in the injection process, the movable mold is in the mold closed state in which the movable mold abuts the fixed mold of the mold and is then in a state in which the end surface 60a is pressed against the wall surface of the movable mold by an injection pressure generated when the resin melted in the mold closed state is injected into the hollow portion formed between abutting portions, and thus the resin molded portion 100 having the positioning pin 115 which protrudes from the end surface 60a is formed.

Accordingly, the end surface 60a of the stator core 60 can be prevented from being covered with the resin, and thus an area in which the end surface 60a of the metallic stator core 60 abuts the abutting surface 210 of the metallic pump main body 21 can be ensured. Therefore, the heat radiation performance of the pump device 10 can be enhanced.

Also, in the mounting process, while the positioning pin 115 is inserted into the hole portion 210a1 provided in the abutting surface 210, the abutting surface 210 comes into contact with the end surface 60a, and thus the pump main body 21 is installed at the stator module 140. Therefore, the man-hours for manufacturing the pump device 10 can be reduced, and the positioning accuracy between the pump main body 21 and the stator module 140 can be improved.

4. Modified Examples

Although an embodiment of the present invention has been described above, the present invention can be variously modified. Hereinafter, modified examples will be described.

In the above-described embodiment, the positioning pin 115 extends from the bottom side molded portion 111 to pass through the through-hole 64. However, the positioning pin 115 is not limited thereto. For example, a resin introduction path may be secured from the insulating cover portion 113 to cover a part of the end surface 60a, and the positioning pin for entering the hole portion 210a further from the introduction path may be formed by injection molding.

Also, in the above-described embodiment, the total of six hole portions 210a are provided, and among them, the three hole portions 210a1 in which the screw threads are not formed are provided, and the three hole portions 210a2 in which the screw threads are formed are provided. Further, three positioning pins 115 are provided, and three screws N1 are also provided. However, the number of hole portions 210a, the number of positioning pins 115 and the number of screws N1 can be appropriately changed, and any number may be used.

Also, in the above-described embodiment, the constitution in which the hole portions 210a are provided at intervals of 60 degrees, the positioning pins 115 are arranged at intervals of 120 degrees and the screws N1 are also arranged at intervals of 120 degrees has been described. However, the intervals at which the holes 210a, the positioning pins 115 and the screws N1 are provided may be any interval and may be unequal intervals. Further, it is also possible to adopt a constitution in which these are arranged in circumferential shapes having different diameters rather than the same circumferential shape.

Further, it is preferable that two or more positioning pins 115 be provided to position the end surface 60a in a planar direction. However, as long as the positioning of the insulating cover portion 113 can be performed satisfactorily, a constitution in which only one positioning pin 115 is provided may be adopted.

Also, in the above-described embodiment, the positioning pin 115 is formed by the molten resin entering the through-hole 64. However, the positioning pin 115 may be formed by other methods as long as it is integrated with the stator mold portion 110. For example, a positioning pin formed of a metallic material, a resin material or the like may be set to the movable mold of the mold and the positioning pin may be integrally provided with the stator mold portion 110 by injection molding.

Further, the mounting of the pump main body 21 on the resin molded portion 100 is not limited to that described above. For example, by deviating the pump main body 21 60 degrees from the resin molded portion 100, it is also possible to flexibly cope with a change in a mounting position of a bolt N2. In this case, for example, by forming the hole portion 210a2 having the screw thread with the hole portion 210a1 as a base, it is possible to flexibly change a mounting angle. Also, the above-mentioned 60 degrees is an example of the angle and may be appropriately changed according to the number of the hole portions 210a1 into which the positioning pins 115 are inserted and the number of the hole portions 210a2 in which the screw threads are formed.

That is, the pump main body 21 is formed from a die cast product, and the hole portion 210a (hole portion 210a1) into which the positioning pin 115 is inserted and the hole portion 210a (the hole portion 210a2; corresponding to the screw hole) in which the thread is formed are provided in the pump main body 21. Additionally, the hole portion 210a1 and the hole portion 210a2 (screw hole) are arranged alternately in the circumferential direction of the abutting surface 210. Further, in an arrangement pattern of the hole portion 210a1 into which the positioning pin 115 is inserted and the hole portion 210a2 (screw hole), there are two arrangement patterns including a first arrangement pattern of a predetermined angular arrangement and a second arrangement pattern in which the positions of the hole portion 210a1 into which the positioning pin 115 is inserted and the hole portion 210a2 (screw hole) are exchanged with respect to the first arrangement pattern. Additionally, one of the first arrangement pattern and the second arrangement pattern is provided on the abutting surface 210.

In this case, since it is sufficient to form the hole portion 210a1 into which the positioning pin 115 is inserted and the hole portion 210a2 in which the screw thread is formed on the die cast product after the die casting, a die cast mold (mold) for manufacturing the pump main body 21 can be commonly used in the first arrangement pattern and the second arrangement pattern, and thus it is possible to reduce a cost to that extent.

In addition, in the above-described embodiment, the trochoid pump is described, and thus the pump main body 21 has the concave portion 211 for accommodating the outer rotor 22 and the inner rotor 23 corresponding to the pump rotor. However, the pump main body 21 may have a constitution without the concave portion. For example, when the pump device 10 is a centrifugal pump, an impeller may be arranged on a flat portion. Also, in this case, a constitution in which a casing is provided to cover the flat portion may be provided.

The invention claimed is:

1. A pump device which suctions and discharges a fluid by driving of a pump rotor, comprising:
   a pump main body configured to accommodate the pump rotor and having at least one hole portion in an abutting surface on an opposite side to a side in which the pump rotor is accommodated;
   a motor portion including a rotor installed on an outer circumference of a rotating shaft, a stator core facing an outer circumference of the rotor and having an end surface of the stator core in an axial direction be in contact with the abutting surface, and a coil installed at the stator core through a bobbin; and
   a molded portion configured to integrally hold the stator core and integrally provided with at least one positioning pin protruding from the end surface and inserted into the corresponding hole portion,
   wherein a plurality of main pole teeth protruding toward an inner circumference side are provided at the stator core, and a coil winding body having a coil is installed at the main pole teeth,
   an insulating cover portion which covers the coil winding body protruding from the end surface is intermittently provided in the molded portion in a circumferential direction, and
   the positioning pin protrudes from between adjacent insulating cover portions, and a protruding height thereof is lower than a protruding height of the insulating cover portion from the end surface.

2. The pump device according to claim 1, wherein a through-hole is provided in the stator core, and the through-hole passes through the stator core in the axial direction of the rotating shaft,
   a bottom side molded portion which supports the stator core on an opposite side to the end surface in contact with the abutting surface in the axial direction is provided at the molded portion, and
   the positioning pin passes through the through-hole from the bottom side molded portion and protrudes from the end surface.

3. The pump device according to claim 2, wherein the at least one positioning pin comprises a plurality of the positioning pins provided in a circumferential direction of the stator core,
   the at least one hole portion comprises a plurality of the hole portions in a greater number than the positioning pins, and the hole portions are provided in a circumferential direction of the pump main body, and
   the hole portions into which the positioning pins are not inserted are screw holes, and screws which fix the stator core are screwed into the screw holes.

4. The pump device according to claim 3, wherein the pump main body is formed from a die cast product,
   the hole portions into which the positioning pins are inserted and the screw holes are alternately arranged in a circumferential direction of the abutting surface,
   an arrangement pattern of the hole portions into which the positioning pins are inserted and the screw holes includes two arrangement patterns including a first arrangement pattern of a predetermined angular arrangement and a second arrangement pattern in which positions of the hole portions into which the positioning pins are inserted and the screw holes are exchanged with respect to the first arrangement pattern, and
   one of the first arrangement pattern and the second arrangement pattern is provided on the abutting surface.

5. The pump device according to claim 1, wherein the at least one positioning pin comprises a plurality of the positioning pins provided in a circumferential direction of the stator core,
   the at least one hole portion comprises a plurality of the hole portions in a greater number than the positioning pins, and the hole portions are provided in a circumferential direction of the pump main body, and
   the hole portions into which the positioning pins are not inserted are screw holes, and screws which fix the stator core are screwed into the screw holes.

6. The pump device according to claim 5, wherein the pump main body is formed from a die cast product,
   the hole portions into which the positioning pins are inserted and the screw holes are alternately arranged in a circumferential direction of the abutting surface,
   an arrangement pattern of the hole portions into which the positioning pins are inserted and the screw holes includes two arrangement patterns including a first arrangement pattern of a predetermined angular arrangement and a second arrangement pattern in which positions of the hole portions into which the positioning pins are inserted and the screw holes are exchanged with respect to the first arrangement pattern, and
   one of the first arrangement pattern and the second arrangement pattern is provided on the abutting surface.

7. A method of manufacturing a pump device which suctions and discharges a fluid by driving of a pump rotor, the method comprising:
   installing a stator core on a wall surface of a movable mold of a mold wherein an end surface of the stator core is in contact with the wall surface;

injecting a melted resin into a hollow portion formed between abutting portions in a mold closed state in which the movable mold abuts a fixed mold of the mold, to form a molded portion having a positioning pin protruding from the end surface of the stator;

moving the movable mold in a mold opening state and taking out a stator module integrally formed with the stator core; and mounting the stator module to a pump main body by inserting the positioning pin into a hole portion provided in an abutting surface of the pump main body and keeping the end surface of the stator core in contact with the abutting surface.

* * * * *